Nov. 17, 1925.

L. E. BALTZLEY

ADJUSTING DEVICE

Filed Jan. 15, 1925

1,562,070

INVENTOR

Louis E. Baltzley

Patented Nov. 17, 1925.

1,562,070

UNITED STATES PATENT OFFICE.

LOUIS E. BALTZLEY, OF GLEN RIDGE, NEW JERSEY.

ADJUSTING DEVICE.

Application filed January 15, 1925. Serial No. 2,493.

*To all whom it may concern:*

Be it known that I, LOUIS E. BALTZLEY, a citizen of the United States, and a resident of Glen Ridge, Essex County, and State of New Jersey, have invented certain new and useful Improvements in Adjusting Devices, of which the following is a specification.

My present invention relates to mechanism for adjusting or controlling various instruments, one of the uses of the same being the setting of variable condensers and the like employed in radio receiving sets.

Various forms of reduction gearing have heretofore been proposed for this purpose, but the same are faulty because of "back lash" and other inaccuracies naturally occurring in any train of gearing.

Objects of my invention are to overcome these faults and to provide simple, effective means for accurately adjusting and in such a form that it may be quickly and readily applied.

The accompanying drawing forming part of this specification illustrate a practical commercial embodiment of the invention, in which.

Figure 1:
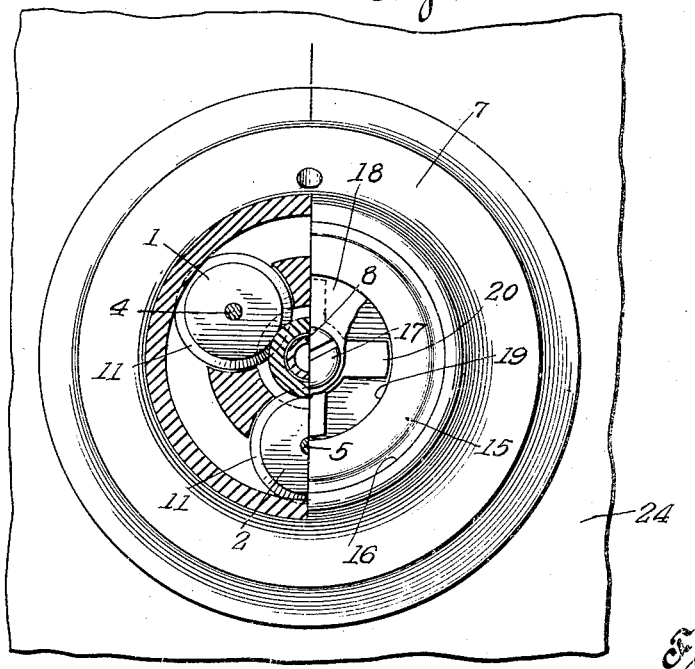
Figure 1 is a part sectional front elevation.

The use of gearing is avoided in my invention through the employment of a system of rollers, patterned somewhat after the nature of a roller bearing and having rolling thrust engagement at their opposite ends respectively with a circular race or track and with a common actuating roll.

In the illustration, three of the rollers are provided, the same being designated 1, 2 and 3, and shown slidingly journaled on pins or studs 4, 5, 6, secured on the back of a driving member 7 having a sleeve 8 with a set screw 9 for attachment to the shaft or part 10 to be adjusted. The pivot studs 4, 5 and 6 are grouped equidistantly in triangular relation about the axis of the sleeve and parallel to such axis.

The rollers are shown as beveled at their opposite ends, at 11 and 12, and the outer ends 11 are shown as of considerably larger diameter than the inner ends 12 to provide a differential effect.

A common actuator for the three rollers is illustrated at 13 in the form of a roller journaled on the sleeve and having a beveled inner end 14 engaged with the larger beveled ends of the rollers. The outer end of this actuating roll is shown as enlarged to provide a handle 15 which seats in a countersunk portion 16 in the outer face of the driver.

The actuating roll is confined in driving relation to the rollers in the illustration by a screw 17 threaded into the outer end of the sleeve. This screw is shown as bearing against a washer 18 seated in a cavity 19 in the face of the handle and a bowed spring 20 of cruciform shape is shown seated in this cavity at the back of the washer, exerting a longitudinal thrust against the actuating roll, which as shown, is capable of a limited longitudinal movement on its axis.

Figure 3:
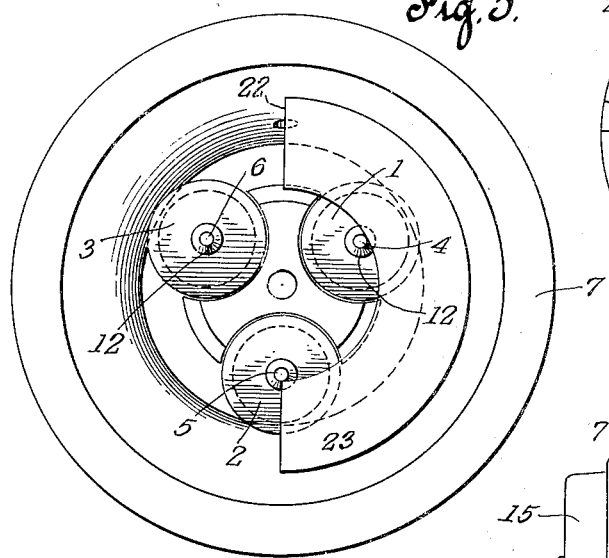
Figure 3 is a part sectional rear view.
Figure 4:
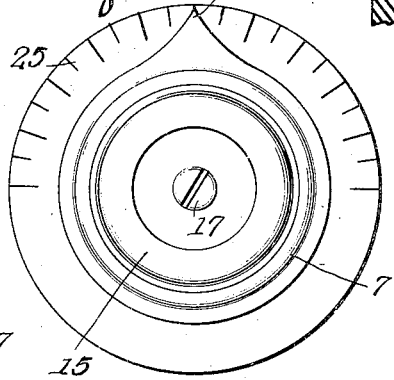
Figures 4 and 5 are broken front and sectional views of a slightly modified form.
Figure 5:
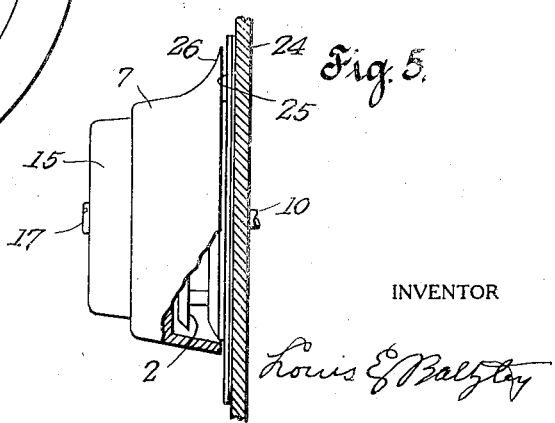

The inner ends of the rollers engage an annular track 21 shown as beveled to mesh the bevel of the rollers and forming part of a ring 22 having a friction surface 23 for slipping engagement with a supporting surface 24. This track member may be entirely covered and concealed by the driver or sleeve member which is attached to the shaft, as in Figures 1 to 3, or it may be extended beyond such member, as in Figures 4 and 5, and graduated to form a scale 25 for a mark or pointer 26 provided on the driver.

The adjusting mechanism is secured on the shaft with the spring under sufficient tension to hold the central roll yieldingly engaged with the ends of the three rollers, the rollers engaged with the track and the track engaging the supporting surface with a light slipping friction. The desired tension may be secured by shifting the driver nearer to or further from the support, the first adjustment having the effect of increasing the tension and the second having the effect of reducing the spring force. The direct end to end engagement of the parts eliminates any possibility of lost motion or back lash and compensates for any inequalities in the finish or size of the parts.

The three point engagement with the track ring also enables the device to accommodate itself to any misalinement such as results for instance when the shaft is not strictly perpendicular to the face of the support. The action is quiet and smooth and by means of the differential rollers and by varying the proportions of the differential rollers, practically any desired reduction in speed may be obtained. The longitudinal self-adjustment of the rollers and the common driving roll enables these parts to automatically keep themselves in proper turning engagement.

By rotation of the central button or handle, the shaft or part to be adjusted can be shifted slowly and with great accuracy but at any time the shaft can be quickly turned by simply rotating the driver which is directly coupled to the shaft. In the latter adjustments, the track simply slips over the face of the support as it is a non-stationary part, capable of being readily shifted. This feature of adjustability of the track is particularly important in the modified form of the apparatus, where the track carries a scale, which scale at times must be adjusted or given a primary setting.

The device as a whole is relatively simple, can be produced inexpensively, is free of gears with their attendant faults and inaccuracies and by reason of its design, operates with the quiet direct action of a roller bearing.

Figure 2:
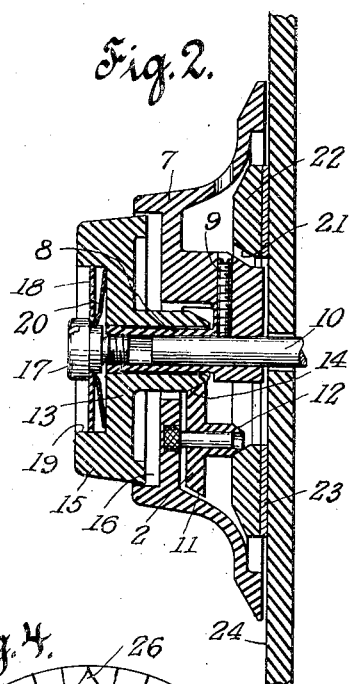
Figure 2 is a cross sectional view.

The actuating roll may be journaled loosely as indicated in Figure 2, so that it may automatically center itself with respect to the three rollers. This is an important feature as it enables the roll to have an equal bearing on all three rollers and to center itself on said rollers even though it be somewhat "off center" as to the shaft axis. The endwise thrust of the rollers automatically takes up any wear of the parts and as the parts may slip, if the occasion requires, no injury or strain will result if the handle is turned too far, for instance in cases where the instrument adjusted is provided with stops limiting its turning movements in one direction or the other.

If the angle of engagement between the rollers and cooperating parts is steep enough and the track is held under sufficient tension, it is possible that the track may remain at rest and the rollers drive the handle when the driver is turned to directly operate the shaft, instead of the track slipping over the supporting surface as heretofore described. It will be obvious that the rollers need not be journaled exactly parallel to the shaft axis and it will be clear that other changes may be made, all coming within the scope of the invention.

What I claim is:

1. An adjusting device comprising a sleeve engageable over a shaft to be adjusted and provided with means for securing the same in adjusted relation on said shaft, rollers supported by said sleeve grouped about the axis of the same and independently adjustable along their own axes, a track member engaged by the inner ends of said rollers, a handle member journaled on the sleeve and adjustable lengthwise thereover into engagement with the outer ends of the rollers, a spring bearing on said handle member and a screw engaged with the outer end of the sleeve and bearing on the spring and accessible at the front of the handle member for varying the thrust of the handle member on the rollers and the consequent pressure of the rollers on the track member.

2. An adjusting device comprising a sleeve engageable over a shaft to be adjusted and provided with means for securing the same in adjusted relation on said shaft, rollers supported by said sleeve grouped about the axis of the same and independently adjustable along their own axes, a track member engaged by the inner ends of said rollers, a handle member journaled on the sleeve and adjustable lengthwise thereover into engagement with the outer ends of the rollers, a spring bearing on said handle member, a screw engaged with the outer end of the sleeve and bearing on the spring and accessible at the front of the handle member for varying the thrust of the handle member on the rollers and the consequent pressure of the rollers on the track member and an abutment surface supporting the track member against the end thrust of the rollers and over which said track member has a sliding engagement to enable self-centering adjustments of the same in response to the action of the rollers.

3. An adjusting device comprising a driver for the part to be adjusted, rollers journaled parallel to the axis of said driver and capable of longitudinal self-adjustment along their own axes, a master roll engaging the rollers at one end, a track engaged by the rollers at their opposite ends, a support for the track and said track having an eccentric floating self-adjusting engagement between the ends of the rollers and said support.

4. An adjusting device comprising a driver for the part to be adjusted, pins grouped about the axis of said driver and parallel thereto, rollers slidably journaled on said pins, a master roller engaging said rollers at one end and a self-adjusting floating track engaged by said rollers at their opposite ends.

5. An adjusting device comprising a driver for the part to be adjusted, pins grouped about the axis of said driver and parallel thereto, rollers slidably journaled on said pins, a master roller engaging said rollers at one end and a self-adjusting floating track engaged by said rollers at their opposite ends, said rollers each being of larger diameter at one end than at the other and having beveled edges at such ends for engagement with the track and master roller respectively.

6. An adjusting device comprising a sleeve engageable over a shaft to be adjusted and provided with means for securing the same in adjusted relation on said shaft.

rollers supported by said sleeve grouped about the axis of the same and independently adjustable along their own axes, a track member engaged by the inner ends of said rollers, a handle member journaled on the sleeve and adjustable lengthwise thereover into engagement with the outer ends of the rollers, a spring bearing on said handle member and a screw engaged with the outer end of the sleeve and bearing on the spring and accessible at the front of the handle member for varying the thrust of the handle member on the rollers and the consequent pressure of the rollers on the track member, the handle member having a cavity in the face of the same receiving said spring and tensioning screw, whereby said parts are out of the way in the operation of said device from the front of the same.

7. An adjusting device comprising rollers grouped about a central axis, a holder on which said rollers are journaled in bearings providing free axial self-adjustment of the rollers, an actuating roll journaled on the central axis aforesaid bearing at its inner end on the outer ends of the rollers and having at its outer end, an actuating handle, a track engaged by the inner ends of the rollers, said track and the holder being relatively rotatable and one having means for detachably securing the same on the part to be adjusted, a spring exerting axial pressure on the actuating roll and means located at the front of the device adjacent the handle for adjusting the tension of said spring and hence the endwise pressure of the actuating roll on the rollers and the pressure of the rollers against the track.

8. An adjusting device comprising rollers grouped about a central axis, a holder on which said rollers are journaled in bearings providing free axial self-adjustment of the rollers, an actuating roll journaled on the central axis aforesaid bearing at its inner end on the outer ends of the rollers and having at its outer end, an actuating handle, a track engaged by the inner ends of the rollers, said track and the holder being relatively rotatable and one having means for detachably securing the same on the part to be adjusted, a spring exerting axial pressure on the actuating roll, means located at the front of the device adjacent the handle for adjusting the tension of said spring and hence the endwise pressure of the actuating roll on the rollers and the pressure of the rollers against the track and a support for the track and over which said track has a free sliding self-adjusting engagement, governed in its slippage by the adjustment of the tensioning spring.

9. An adjusting device comprising a sleeve for engagement with a shaft to be adjusted, pins carried by said sleeve grouped about the axis of the same and parallel to such axis, a roll journaled about said sleeve and having a beveled end, rollers slidingly rotatable on said pins having beveled ends engaged with the beveled end of the roll, a member having a beveled track engaged by the opposite ends of the rollers and a spring exerting endwise thrust to hold the rollers engaged with the roll and track respectively.

10. An adjusting device comprising a sleeve for engagement with a shaft to be adjusted, pins carried by said sleeve grouped about the axis of the same and parallel to such axis, a roll journaled about said sleeve and having a beveled end, rollers slidingly rotatable on said pins having beveled ends engaged with the beveled end of the roll, a member having a beveled track engaged by the opposite ends of the rollers and a spring exerting endwise thrust to hold the rollers engaged with the roll and track respectively, the roll having an axial movement to provide for the yielding action of said spring.

11. An adjusting device comprising a sleeve for engagement with a shaft to be adjusted, pins carried by said sleeve grouped about the axis of the same and parallel to such axis, a roll journaled about said sleeve and having a beveled end, rollers slidingly rotatable on said pins having beveled ends engaged with the beveled end of the roll, a member having a beveled track engaged by the opposite ends of the rollers and a spring exerting endwise thrust to hold the rollers engaged with the roll and track respectively, the roll having an axial movement to provide for the yielding action of said spring, the ends of the rollers in engagement with the track being beveled and of lesser diameter than their opposite ends.

12. An adjusting device comprising a sleeve for engagement with a shaft to be adjusted, pins carried by said sleeve grouped about the axis of the same and parallel to such axis, a roll journaled about said sleeve and having a beveled end, rollers slidingly rotatable on said pins having beveled ends engaged with the beveled end of the roll, a member having a beveled track engaged by the opposite ends of the rollers and a spring exerting endwise thrust to hold the rollers engaged with the roll and track respectively, the roll having a limited axial movement and the spring being engaged with the end of said roll to thrust the same toward the rollers.

13. An adjusting device comprising a track member carrying a scale, a driver for the part to be adjusted having a pointer to read on said scale, rollers journaled on said driver parallel to the axis of the same and capable of longitudinal movement on their own axes, said rollers bearing on the track at their inner ends and a spring pressed roll bearing on the opposite ends of the rollers.

14. An adjusting device comprising a track member carrying a scale, a driver for the part to be adjusted having a pointer to read on said scale, rollers journaled on said driver parallel to the axis of the same and capable of longitudinal movement on their own axes, said rollers bearing on the track at their inner ends and a spring pressed roll bearing on the opposite ends of the rollers, said rollers being of larger diameter at the ends engaged with the roll than at the ends engaged with the track.

15. An adjusting device comprising a rotatable handle, slower turning rollers journaled parallel to the axis of said handle and engaged at their ends by said handle, a track engaged by the opposite ends of said rollers and a holder for the rollers, the holder and track being relatively rotatable and one having means for detachably securing the same on and in supported engagement with the part to be adjusted.

16. An adjusting device comprising rollers grouped about a central axis, a holder on which said rollers are journaled in bearings providing free axial self-adjustment of the rollers, an actuating roll journaled on the central axis aforesaid bearing at its inner end on the outer ends of the rollers and having at its outer end, an actuating handle, a track engaged by the inner ends of the rollers, said track and the holder being relatively rotatable and one having means for detachably securing the same on the part to be adjusted and means for adjustably thrusting the handle roll endwise against the axially self-adjusting rolls and said self-adjusting rolls axially against the track to preserve traction between such parts.

17. An adjusting device comprising a rotatable handle, slower turning rollers engaged at their ends by said handle, a track engaged by the opposite ends of said rollers and a holder for the rollers, the holder and track being relatively rotatable and one having means for engagement with the part to be adjusted and spring means carried thereby adjustable to hold the rotatable handle engaged at a variable spring pressure with the ends of the rollers.

18. An adjusting device comprising a track member carrying a scale, a driver for the part to be adjusted having a marker to read on said scale, rollers journaled on said driver and capable of longitudinal self-adjustment on their own axes, said rollers bearing on the track member at their inner ends and a spring pressed roll bearing on the opposite ends of the rollers.

19. An adjusting device comprising a track member carrying a scale, a driver for the part to be adjusted having a marker to read on said scale, a roller journaled on the driver and capable of longitudinal axial self-adjustment, said roller bearing on the track at its inner end and a spring pressed roll bearing on the opposite end of the roller.

20. An adjusting device comprising a rotatable handle, a slower turning roller engaged at one end by said handle and mounted for longitudinal axial self-adjustment, a track engaged by the opposite end of said roller and a holder for the roller, said holder and track being relatively rotatable and one having means for engagement with the part to be adjusted and spring means carried thereby adjustable to hold the rotatable handle engaged at a variable spring pressure with the ends of the rollers.

21. An adjusting device comprising a driver for the part to be adjusted, a roller journaled on said driver and having a bearing permitting rotating axial adjustment of said roller but confining the same against other movements, a track engaged by one end of said roller, an actuating roll engaged with the opposite end of said roller and tension means for yieldingly holding said actuating roll engaged with one end of the roller and the opposite end of the roller engaged with the track.

22. An adjusting device comprising a driver for the part to be adjusted, pins grouped about the axis of said driver, rollers slidably journaled on said pins, a master roller engaging said rollers at one end and a track engaged by said rollers at their opposite ends.

23. An adjusting device comprising a driver for the part to be adjusted, rollers journaled about the axis of said driver and capable of longitudinal axial self-adjustment, a master roll engaging the rollers at one end and a track engaged by the rollers at their opposite ends, said track being freely shiftable eccentrically about the axis of the driver and automatically centered in respect thereto by the rollers engaging the same.

24. An adjusting device comprising a sleeve for engagement over the part to be adjusted, a handle eccentrically self-adjustable about said sleeve, rollers journaled on said sleeve and engaged by said self-adjusting handle and a part for engagement by said rollers.

25. An adjusting device comprising a sleeve, self-adjusting rollers journaled about the axis thereof, a part for engagement by said rollers and a common driver for the rollers having an eccentric self-adjusting mounting on the roller carrying sleeve.

26. An adjusting device comprising a sleeve for engagement over the part to be adjusted, rollers journaled about the axis of said sleeve and having self-adjusting mountings thereon, a member for engagement with the rollers at one end and a common actuating roll for engagement with the opposite ends of the rollers, said actuating roll having an eccentrically self-adjustable mounting on the sleeve enabling said roll to center itself on the rollers.

27. An adjusting device comprising rollers grouped about a central axis, a holder on which said rollers are journaled in bearings providing free axial self-adjustment of the rollers, an actuating roll journaled on the central axis aforesaid bearing at its inner end on the outer ends of the rollers and having at its outer end, an actuating handle, a freely adjustable eccentrically shiftable track engaged by the inner ends of said rollers and centered entirely and automatically by the traction of said rollers therewith, said track and holder being relatively rotatable and one having means for connecting the same with the part to be adjusted and means for maintaining tractive engagement between the handle roll, track centering rolls and track.

In witness whereof, I have hereunto set my hand this 13th day of January, 1925.

LOUIS E. BALTZLEY.